United States Patent [19]

Van Den Brink

[11] Patent Number: 4,768,668

[45] Date of Patent: Sep. 6, 1988

[54] CONTAINER HAVING A DETACHABLY FASTENED LID

[75] Inventor: Anthonie Van Den Brink, Westmaas, Netherlands

[73] Assignee: Eurotool B.V., 's-Gravendeel, Netherlands

[21] Appl. No.: 49,339

[22] Filed: May 13, 1987

[30] Foreign Application Priority Data

May 13, 1986 [NL] Netherlands .................. 8601202

[51] Int. Cl.⁴ .............................................. B65D 41/22
[52] U.S. Cl. ...................................... 215/305; 220/307
[58] Field of Search ............... 215/272, 305, 320, 321, 215/256; 220/306, 307, 270

[56] References Cited

U.S. PATENT DOCUMENTS

| 3,586,197 | 6/1971 | Vivas | 215/305 |
| 4,376,493 | 3/1983 | Gall | 220/307 |
| 4,387,820 | 6/1983 | Ignell | 220/306 X |
| 4,660,735 | 4/1987 | Peschardt et al. | 220/306 X |

FOREIGN PATENT DOCUMENTS

| 0048472 | 3/1982 | European Pat. Off. |
| 2557858 | 7/1985 | France |
| 83681 | 2/1982 | Luxembourg |

Primary Examiner—Donald F. Norton
Attorney, Agent, or Firm—Cushman, Darby & Cushman

[57] ABSTRACT

Container (1) having a lid (3) detachably fastened on its open top and having around the outer periphery of its open top an outwardly projecting thickening (2) or rim, the lid (3) resting with its peripheral part (4') on the rim of the opening and having a substantially downwardly directed annular closure lip (5) which is joined to an annular bending lip (7) which is adapted to be moved hingedly between an upper and a lower position and which is provided with an inwardly directed shoulder (8) which engages under the thickening (2) or rim with the lid (3) fastened on the container (1) and which can be brought out of engagement with the thickening by turning the bending lip (7) upwards the bending lip (7) being joined by a hinge lip (6) to the closure lip (5) and, near the connection to the hinge lip (6), being provided with second, outwardly directed shoulder means (9) with a surface directed towards the outer side of the hinge lip (6) which is so shaped that when the bending lip (7) is turned into the lower position the shortest distance between said surface and the outer side of the hinge lip (6) gradually increases in the upward direction and, when the bending lip is turned into the upper position, at least substantially the end of said surface lies against the hinge lip.

4 Claims, 3 Drawing Sheets

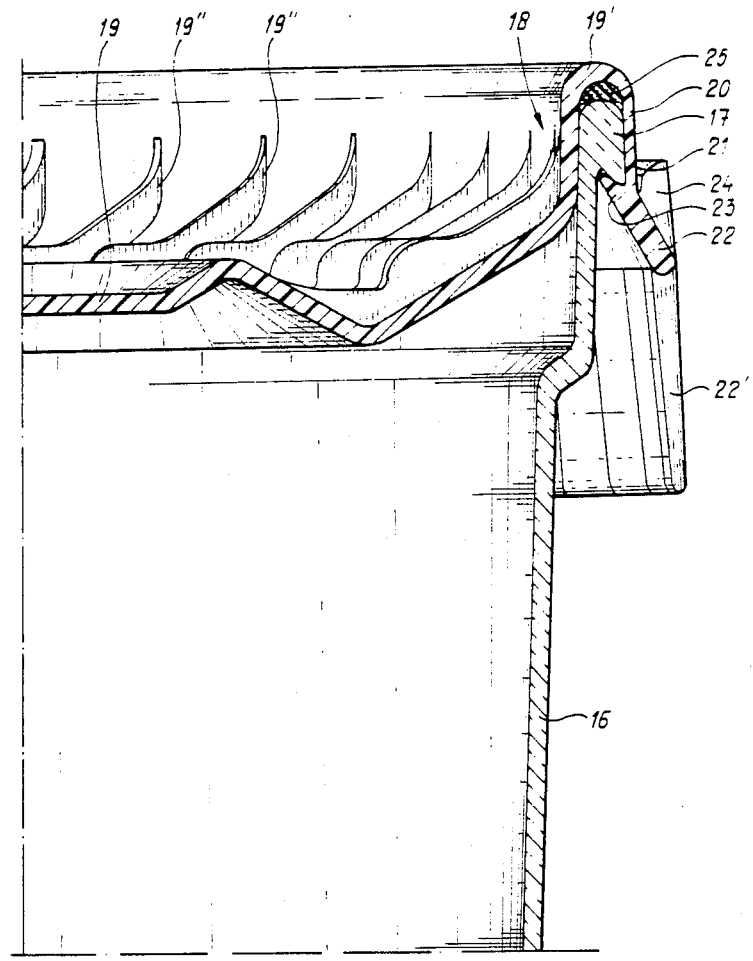

CONTAINER HAVING A DETACHABLY FASTENED LID

The invention relates to a container having a lid detachably fastened on its open top and having around the outer periphery of its open top an outwardly projecting thickening or rim, the lid having a central part which covers the opening in the open top of the container and resting with its peripheral part on the rim of the opening and also having a substantially downwardly directed annular closure lip which adjoins said peripheral part and at its other end is joined to an annular bending lip which is adapted to be moved hingedly between an upper and a lower position and which is provided with an inwardly directed shoulder which engages under the thickening or rim with the lid fastened on the container and the bending lip turned into the lower position and can be brought out of engagement with the thickening by turning the bending lip upwards in order to detach the lid from the container. A container of this kind is known from French patent specification No. 2377333.

In the known container the bending lip of the lid is joined directly to the closure lip, so that when the bending lip is turned up and down only the connection between that lip and the closure lip acts as a hinge, and thus this connection is subjected to heavy bending loads with the consequence that it will fail after only a relatively small number of bending operations, and the lid will therefore become unusable.

The invention seeks to provide a container of the type defined whose lid does not have this shortcoming.

This aim is achieved in that in the container according to the invention the bending lip of lid is joined by a hinge lip to the closure lip and, near the connection to the hinge lip, is provided with second, outwardly directed shoulder means with a surface directed towards the outer side of the hinge lip which is so shaped that when the bending lip is turned into the lower position the shortest distance between said surface and the outer side of the hinge lip gradually increases in the upward direction and, when the bending lip is turned into the upper position, at least substantially the end of said surface lies against the hinge lip.

With a lid constructed in this manner the hinge line about which the bending lip turns during the upward movement of the latter will be displaced from the connection between the bending lip and the hinge lip towards that part of the latter where the end of the aforesaid surface of the second shoulder comes to bear against it, while on the downward movement of that part of the hinge lip it will be displaced towards said connection, so that when the bending lip is turned up and down the connection between this lip and the remainder of the lid is not the only part acting as a hinge.

The aforesaid surface of the second shoulder means preferably extends substantially from the connection of the bending lip to the hinge lip, while it is likewise preferable for said surface of the second shoulder seans to have a convexly curved shape.

With a lid constructed in this manner the hinge lip will be uniformly bent substantially over its entire height when the bending lip is turned up and down, so that only a slight bending stress will occur.

In the case of a container having a lid fastened on it and having a gap between it and the bending lip which has been turned down, it is preferable to provide at the end of the bending lip an annular tamperproof lip which can be broken or torn off and which, when the lid is fastened on the container, substantially closes the gap behind the bending lip in relation to the surroundings, so that in the undamaged state this tamperproof lip is proof that the lid fastened on the container has never been opened.

The invention also relates to a method of producing a lid for the container by injection moulding in a die, the lid being according to the invention produced in the closed die with the bending lip in the downwardly turned position, while on the opening of the die the bending lip is then brought into the upwardly turned position.

The invention is explained more fully below with reference to the drawings, in which:

FIG. 1b shows an axial section of a part of a container having a lid fastened on it according to another embodiment of the invention.

Figure 1A:
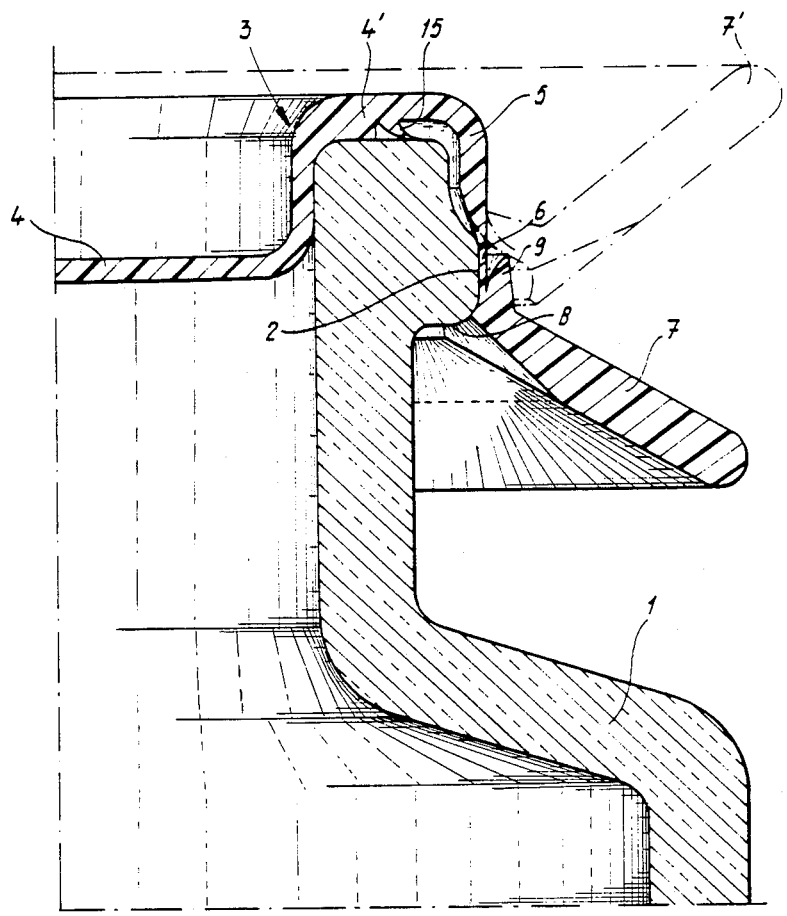
FIG. 1a is an axial section of a part of a container having a lid according to the invention fastened on it.

As shown in FIG. 1, the container 1 has an open top with an outwardly projecting thickening 2 formed around its outer periphery. On this open top is fastened a lid 3 which has a central part 4 covering the opening of the container, with its peripheral part 4' resting on the rim of the opening of the container, this peripheral part 4' merging into a downwardly directed closure lip 5.

The closure lip 5 merges into a hinge lip 6, which forms the connection between a bending lip 7 and the closure lip 5. The bending lip 7 is provided with a downwardly directed shoulder 8, which in the closed position of the bending lip 7, as shown in the figure, engages under the thickening 2 of the container. The bending lip 7 is in addition provided with an outwardly projecting shoulder 9 which has a surface directed towards the hinge lip 6 and convexly curved in such a manner that when the bending lip 7 is turned upwards into the position 7' this convexly curved surface will so-to-speak roll along the hinge lip 6, so that the latter will be bent uniformly over its entire height. When the bending lip 7 is turned up into the position 7', the shoulder 8 is brought out of engagement with the thickening 2, so that the lid 3 can be removed from the container 1.

On the inner side of the peripheral part 4' a projection 15 is formed to ensure a good sealing action of the lid 3.

As shown in FIG. 1b the container 16 has an open top with an outwardly projecting thickening 17 formed around its outer periphery. On this open top is fastened a lid 18 which has a central part 19 covering the opening of the container, with its peripheral part 19' resting on the rim op the opening of the container, whereas reinforcing ribs 19" are provided. Said peripheral part 19' merges into a downwardly directed closure lip 20.

The closure lip 20 merges into a hinge lip 21, which forms the connection between a bending lip 22 and the closure lip 20. The bending lip 22 is provided with a downwardly directed shoulder 23, which in the closed position of the bending lip 22, as shown in the figure, engages under the thickening 17 of the container. Further the bending lip 22 is provided with downwardly directed 22', each extension having an outwardly projecting shoulder 24 which a surface directed towards the hinge lip 21 and convexly curved in such a manner that when the bending lip 22, 22' is turned upwards these convexly curved surfaces will roll along the hinge lip 21, so that the latter will be bent uniformly over its entire height as described herein above for FIG. 1a. On the inner side of the peripheral part 19' sealing means 24 are provided to ensure a good sealing action of the lid 18.

Figure 2:
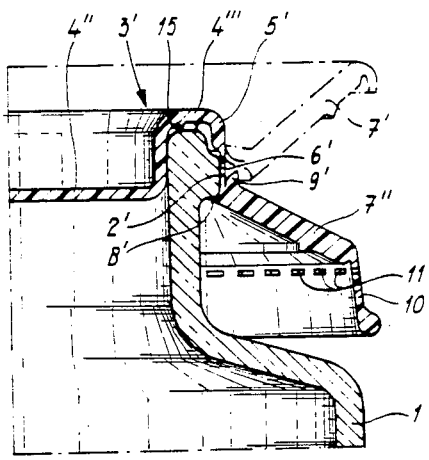
FIG. 2 is an axial section of a part of a container having fastened on it a lid according to still another embodiment of the invention.

FIG. 2 shows another form of a construction of the lid shown in FIG. 1a, in which those parts which correspond to the lid shown in FIG. 1a are given the same reference numerals with the addition of a prime.

At the end of the bending lip 7" a tamperproof lip 10 is attached, the connection between this lip 10 and the bending lip 7" being weakened by perforations 11. When the bending lip 7" is in the downwardly turned position, this tamperproof lip 10 closes the space behind the bending lip 7" in such a manner that a user of the container will be able to grip the rear face of the bending lip by one or more fingers, for the purpose of turning it upwards into the position 7''' in order to detach the lid 3' from the container 1', only after the tamperproof lip 10 has been torn off along the line of perforations 11.

Figure 3:
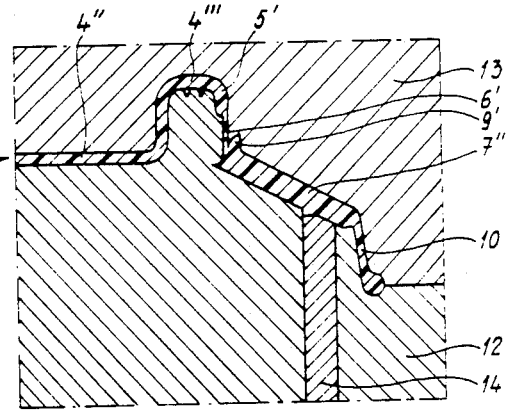
FIGS. 3 and 4 are axial sections of a part of a die for the production of the lid shown in FIG. 2.
Figure 4:
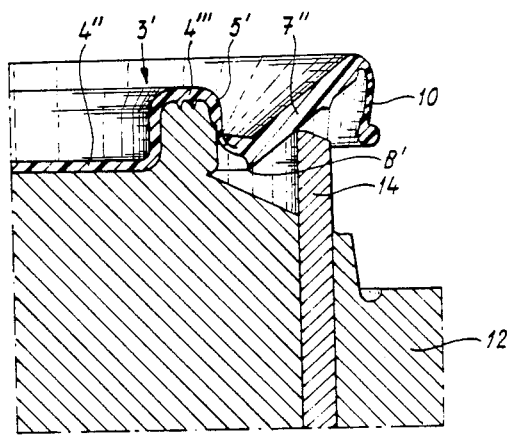

As shown in FIG. 3, for the purpose of manufacturing the lid 3' by injection moulding, a die is used which comprises a bottom part 12 and a top part 13 removable from the latter. After a lid 3' has been formed by injection moulding in the die parts 12 and 13, with the closure lip 7" in the downwardly turned position, the top part 13 is removed from the bottom part 12, whereupon a sliding ring 14 or pin members contained in the bottom part 12 is raised, as shown in FIG. 3, so that the bending lip 7" together with the tamperproof lip 10 formed on it is brought into the upwardly turned position. The completed lid 3' can thereupon be removed from the bottom part 12 of the die.

The lid 3' formed in this manner can then be placed on a filled container 1, whereupon the bending lip 7", together with the tamperproof lip 10 formed on it, is brought into the downwardly turned position in order to fasten the lid 3' on this container. The perforations 11 are then formed, for example by means of laser beams.

While it is in the undamaged state the tamperproof lip 10 then gives a guarantee that after the filling of the container 1' the lid 3' fastened on it has never been opened, so that the contents of the container have not been tampered with.

I claim:

1. An open topped container having a lid detachably fastened thereover and having around the outer periphery of said open top an outwardly projecting rim, said lid having a central part which covers the opening in the open top of said container, said central part having a peripheral said portion, said side portion resting on said rim of said opening, said central part also having a substantially downwardly directed annular closure skirt adjoining said peripheral side portion, said closure skirt being joined to an annular bending lip which bending lip is adapted to be moved hingedly between an upper a lower position, said bending lip also being provided with an inwardly directed shoulder which engages under said container rim; said the lid being fastened on said container when said bending lip is positioned in the lower positon, said inwardly directed shoulder is brought out of engagement with said rim by moving said bending lip to said upper position so as to detach said lid from said open top of said container, wherein said bending lip is joined by a hinge to said closure skirt and, near the connection to the said hinge, said bending lip is provided with a second, outwardly proturding shoulder means, said second shoulder means having a surface directed towards an outer side of said hinge, said shoulder surface being so shaped that when said bending lip is moved to said upper position, said shoulder surface bears against said outerside of said hinge.

2. A container according to claim 1, wherein said surface of said second shoulder means extends substantially from said connection between said bending lip and said hinge.

3. A container according to claim 2, wherein said surface of said second shoulder means has a convexly curved shape.

4. A container according to claim 3, wherein a gap exists between said bending lip and said container when said bending lip has been moved to said lower position, and wherein at a lower peripheral edge of said bending lip an annular tamper-proof lip is provided which can be broken or torn off and, when said lid is fastened on said container, said tamper proof lip substantially reduces said gap between said bending lip and said container.

* * * * *